United States Patent
Eastman

(10) Patent No.: US 6,199,699 B1
(45) Date of Patent: Mar. 13, 2001

(54) INSULATED FOOD STORAGE HOUSING ASSEMBLY

(76) Inventor: Robert Eastman, 1232 Briarcliffe, Flint, MI (US) 48532

(*) Notice: Subject to any disclaimer, the term of this patent is extended or adjusted under 35 U.S.C. 154(b) by 0 days.

(21) Appl. No.: 09/391,440

(22) Filed: Sep. 8, 1999

Related U.S. Application Data

(60) Provisional application No. 60/099,408, filed on Sep. 8, 1998.

(51) Int. Cl.[7] .................................................. A45C 11/20
(52) U.S. Cl. ......................... 206/545; 206/546; 206/549; 206/541; 220/4.27; 220/23.87
(58) Field of Search ................................ 206/545, 546, 206/549, 541; 220/4.27, 23.87

(56) References Cited

U.S. PATENT DOCUMENTS

| | | | |
|---|---|---|---|
| 2,595,113 | * 4/1952 | Taberer | 206/541 |
| 2,598,995 | * 6/1952 | Graff | 206/545 |
| 2,656,946 | * 10/1953 | Clarke | 206/545 |
| 3,610,461 | * 10/1971 | Allyn | 220/212 |
| 4,965,907 | * 10/1990 | Baumgarten | 220/759 |
| 5,373,608 | * 12/1994 | Welch | 16/425 |

* cited by examiner

Primary Examiner—Paul T. Sewell
Assistant Examiner—Troy Arnold

(57) ABSTRACT

An insulated housing assembly for the transport and storage of food items while maintaining the temperature of the food items. The invention provides lower and upper assembly portions which when mated define a compartment for the storage of stackable food containers. The upper and lower asemblies are surrounded by a layer of insulating material to prevent the loss of heat from the food items contained within the compartment. The insulated housing assembly also incudes a swivable handle in a recess for facilitating carrying the insulated assembly. Also included in another recess is a handle for manipulating the containers disposed within the compartent, which have catches for attchment of the handle.

6 Claims, 4 Drawing Sheets

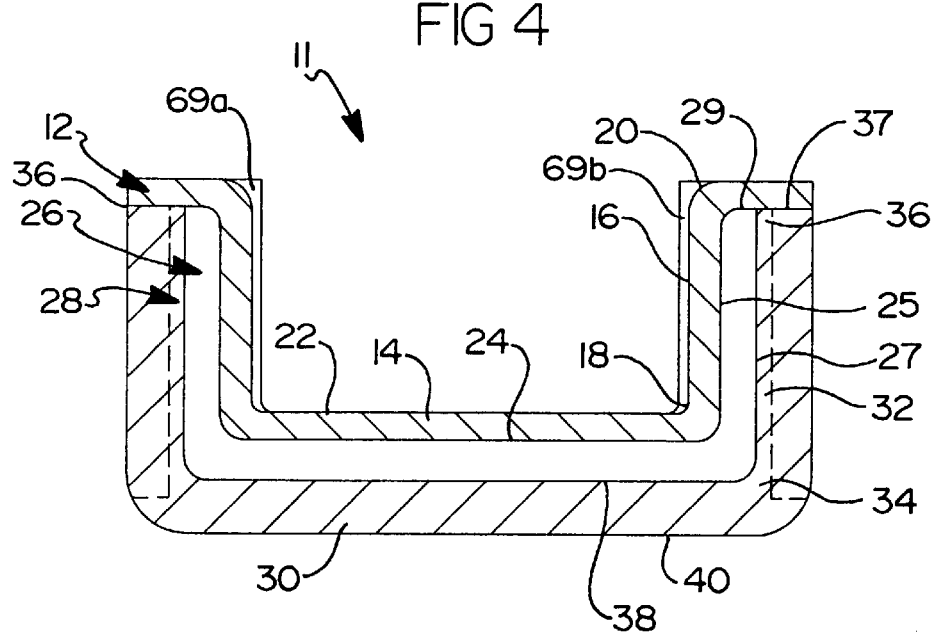
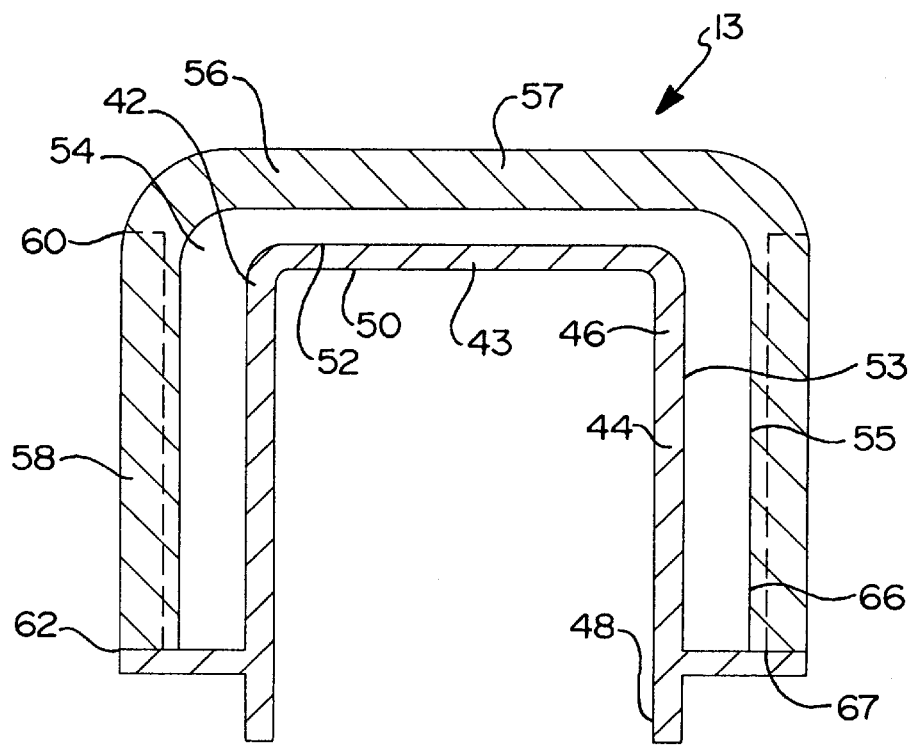

INSULATED FOOD STORAGE HOUSING ASSEMBLY

CROSS-REFERENCE TO RELATED APPLICATIONS

This application is a completion application of a co-pending U.S. Provisional Patent Application Ser. No. 60/099,408 entitled "Insulated Food Storage Housing Assembly" filed Sep. 8, 1998, the disclosure of which is hereby incorporated by reference.

STATEMENT REGARDING FEDERALLY SPONSORED RESEARCH OR DEVELOPMENT

Not Applicable.

BACKGROUND OF THE INVENTION

1. Field of the Invention

The present invention pertains to food storage devices. More particularly, the present invention pertains to insulated food storage devices. With even more particularity, the present invention pertains to insulated housing for transporting storable food storage containers.

2. Prior Art

There exist in today's fast paced and mobile society the need for an easily carried portable device for transporting food stuff that allows for maintaining the temperature and freshness of the food items. It is to this purpose that the present invention is directed.

The present invention does not maintain the temperature of food items by introduction of ice or a heat source, as is commonly known in the art for "coolers." The present invention is directed at maintaining the temperature of the food items by preventing absorption of the ambient heat of the food items, by providing a sealable container layered with an insulating material to prevent heat loss.

It is also a purpose of the present invention to provide for an insulating housing assembly that can carry multiple food containers for different food items, but still can be easily carried or transported. To this effect the present invention provides for the stackability of individual containers within the housing assembly to facilitate transportation of different foods while economizing the space requirements of the housing assembly.

Thermally insulated metal containers, commonly known as thermos or vacuum bottles, are commonly known in the art. U.S. Pat., Ser. No. 5,153,977 entitled method for making double walled insulating metal container which discloses a method for making a thermos bottle; the disclosure of which is herein incorporated by reference. U.S. Pat. No. 5,153,977 teaches a method for manufacturing a vacuum sealed insulating container without substantial defects and by an automated process. The above referenced U.S. Patent does not directly address the needs as outlined in the previous paragraphs for a stackable, easily portable device for carrying food stuff. It should be noted that the above referenced U.S. Patent utilizes a hollow vacuous space for providing insulation in the container formed by the patented process. The present invention does not utilize an air gap to provide insulation, but rather an insulative material is housed between opposing layers to prevent heat absorption by the environment.

BRIEF SUMMARY OF THE INVENTION

It is therefore, the purpose of the present invention to cure those deficiencies outlined above by providing an insulated housing assembly for the easy storage and transportation of food items. Thus, in accordance with the present invention there is provided an insulated housing assembly comprising:

(a) a lower assembly, the lower assembly including a cup, insulating material disposed thereabout, and a receptor for receiving the insulated material;

(b) an upper assembly, the upper assembly being mateable with the lower assembly, the upper assembly including a cover, an insulating material disposed thereabout, and an outer shell in which the insulating material and cover is seated;

(c) a compartment defined by the interior space formed by the mating of the lower and upper assemblies, for removable storage or a plurality of stackable food containers, and means for sealingly, releasably locking the upper and lower assemblies, and;

(d) at least one food storage container removably stackable in the compartment.

BRIEF DESCRIPTION OF THE SEVERAL VIEWS OF THE DRAWINGS

FIG. 4 is a cross-sectional view of a lower assembly of the insulated housing assembly hereof, FIG. 5 is a cross-sectional view of an upper assembly of the insulated material of the lower assembly.

DETAILED DESCRIPTION OF THE INVENTION

Figure 1:
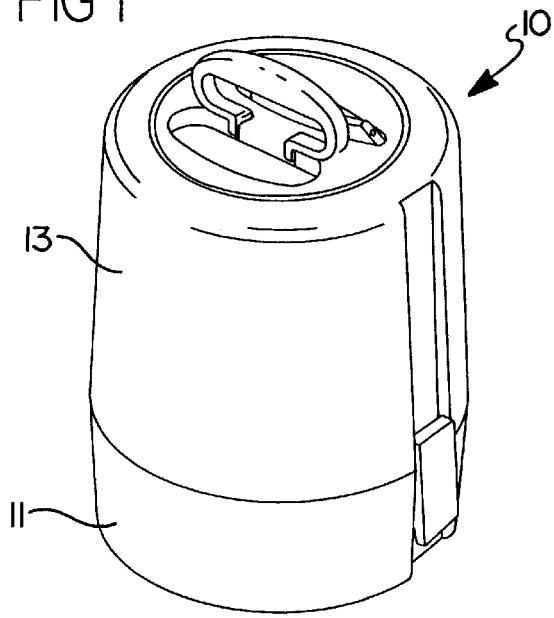
FIG. 1 is a perspective view of a preferred embodiment of an insulated housing assembly in accordance herewith.
Figure 2:
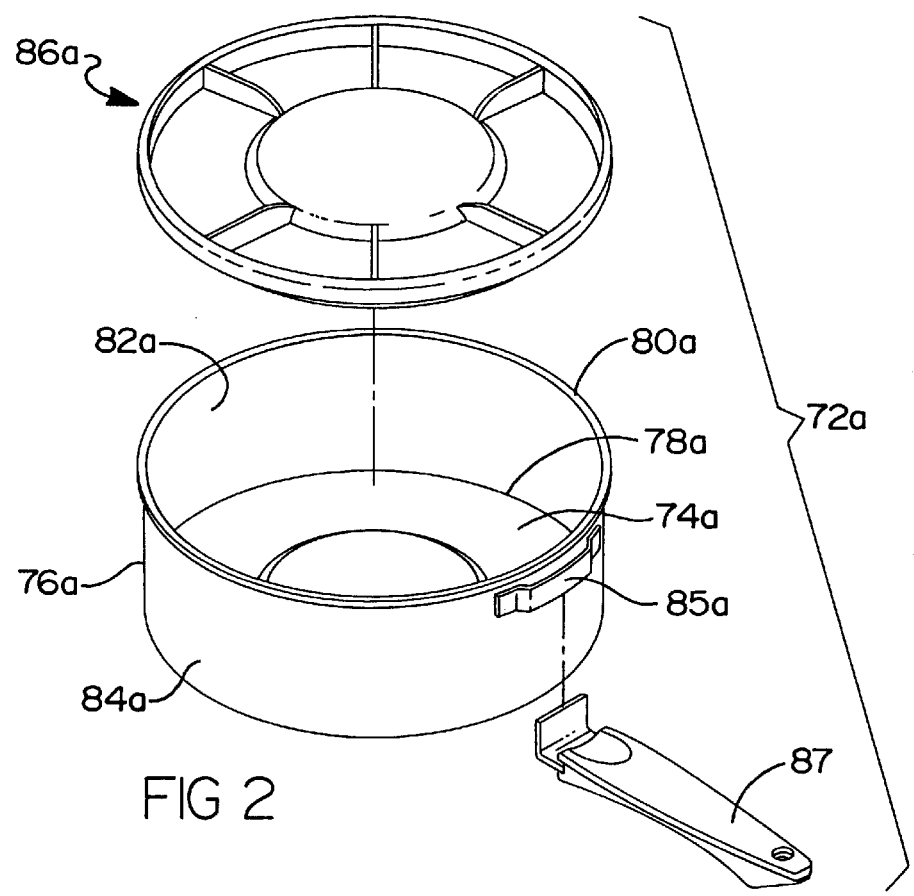
FIG. 2 is a perspective view of a food container of the assembly hereof.
Figure 3:
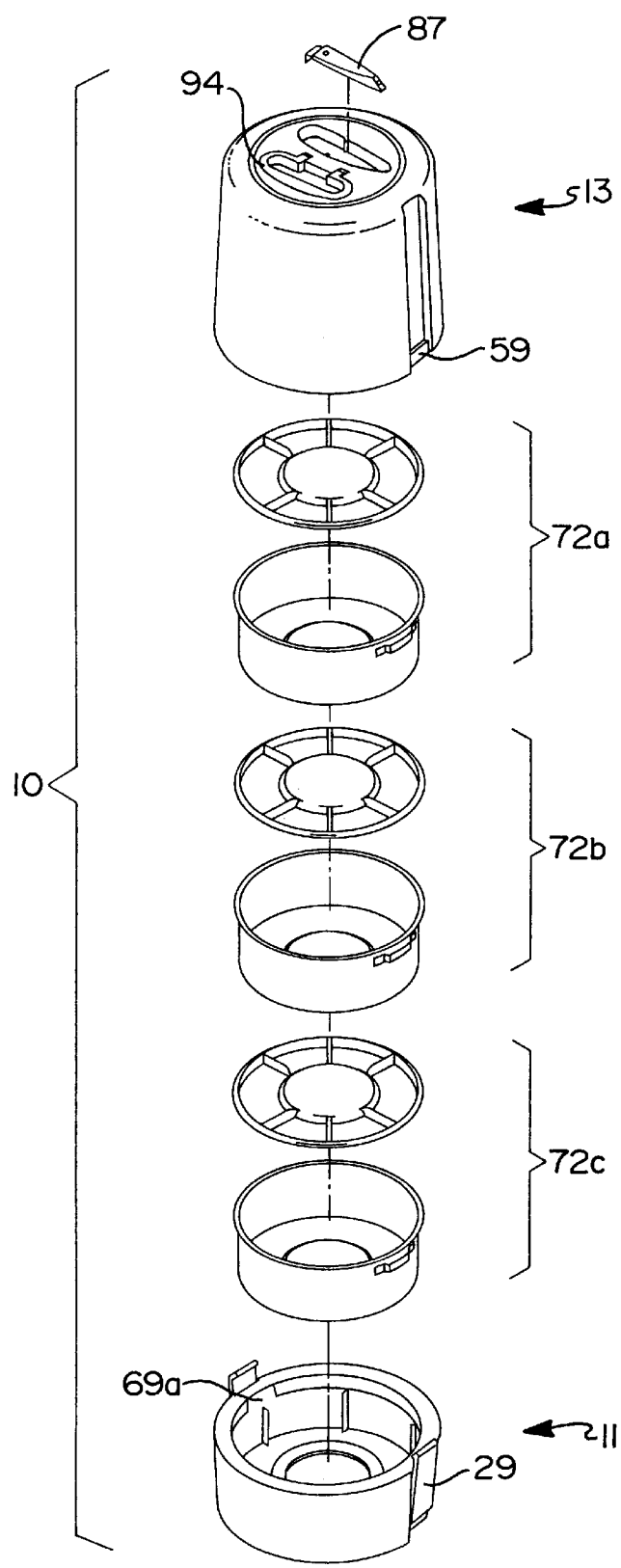
FIG. 3 is an exploded view of the preferred embodiment of the assembly hereof.
Figure 6:
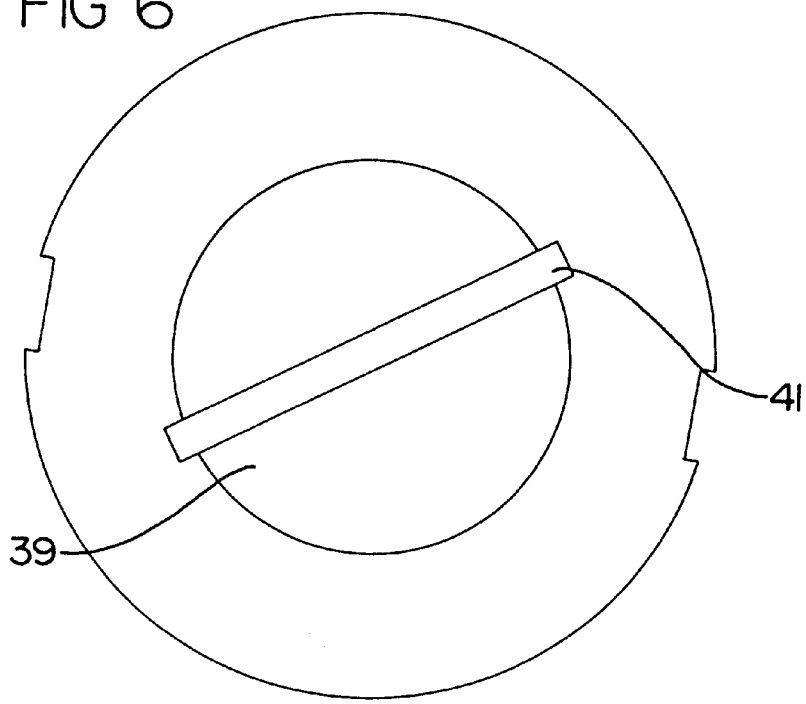
FIG. 6 is a bottom view of the lower assembly.
Figure 7:
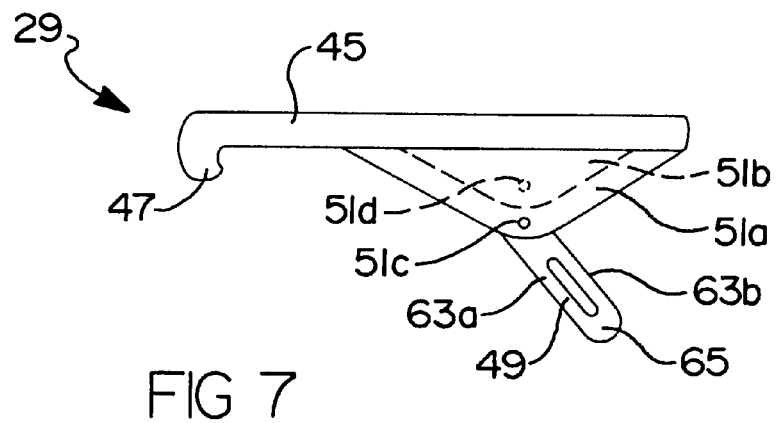
FIG. 7 is a perspective view of a fastening means of the assembly hereof

Referring now to the drawing, there is depicted therein an insulated housing assembly for transporting food storage containers in accordance with a preferred embodiment hereof and which is generally depicted at 10. The insulated housing assembly 10 hereof, generally, comprises:

(a) a lower assembly 11, the lower assembly 11 including a cup 12, an insulated material 26 disposed thereabout, and a receptor 28 for receiving the insulated material 26 and the cup;

(b) an upper assembly 13, the upper assembly 13 being mateable with the lower assembly, the upper assembly 13 including a cover 42, an insulating material 54 disposed thereabout, and an outer shell 56 in which the insulating material 54 and the cover 42 is seated;

(c) a compartment 70 defined by the interior space formed by the mating of the lower and upper assemblies 11,13, for removable storage of a plurality of stackable food containers 72a, 72b, 72c, and means 29 for sealingly, releasably locking the upper and lower assemblies 11 and 13, and (d) at least one food storage container 72a removably stackable in the compartment 70.

As noted, the insulated housing assembly 10 is particularly adapted for storage and storing, in particular, for a plurality of containers for foodstuffs.

Each of the cup 12, the receptor 28, the cover 42, and the outer shell 56 may comprise high-density plastic, metal, or any other suitable material. The insulating materials 26, 54 may comprise insulative foam, a coated glass, or any other type of insulating material, which is known in the art. Preferably, the insulative material is a foam. The type of foam is not critical hereto only that it is insulative.

With more particularity and as shown in the drawing, the cup 12 comprises a base 14 for supporting a food storage container component and a side wall 16 integral with the base 14 and extending upwardly from a junction 18 between the base 14 and the wall 16. The wall 16 terminates at an upper end 20. The side wall 16 includes opposed embossments 69a, 69b integrally, formed thereon and placed proximate the upper end 20, as will be further described hereinbelow.

A lip or flange 21 is integral with the side wall 16 and extends radially outwardly from the upper end 20 and is substantially parallel to the base 14. The base 14 is, preferably, a circular base, but may be of any suitable shape. The cup 12 has an inside surface 22 and an outside surface 24.

The insulating material 26, preferably, includes an inner first surface 25 and a outer second surface 27, the first surface 25 abutting against and surrounding the exterior outside surface 24 of the cup 12. The insulating material 26 is of a thickness as to substantially minimize the rate of heat absorption to the assembly or heat loss therefrom, as will be described in greater detail hereinbelow.

The outer second surface 27 of the insulating material 26 abuts against the interior inside surface 38 of the receptor 28.

The receptor 28 comprises a bottom wall 30 to support the weight of the assembly 10. The bottom wall 30 is, preferably, a circular base, although it can have any other desired configuration so long as the entire geometry of the assembly 10 is uniform and consistent. A recess 39 is formed in the bottom wall 30. A handle 41 such as a strap extends across the recess 39 to aid in transport of the assembly 10. The handle 41 is disposed within a plane just below the plane of the bottom 30 to allow standing of the assembly when in use.

The receptor 28 further comprises an upstanding side wall 32 extending upwardly from and integral with the bottom 30 and terminates at an upper end 36. The upstanding side wall 32 terminates at an outer or free edge 37. The outer edge of the lip 21 abuts against the edge 37, as shown.

The receptor has an inside surface 38 and an outside surface 40. The inside surface 38 of the receptor 28 has dimensions substantially equal to those of the outer or second surface 27 of the insulation material 26 and is contiguous therewith. The inside surface 38 receives and is disposed about the second surface 27.

Thus, preferably the outside surface 24 of the cup 12 is in abutment with the first surface 25 of the insulating material 26, and the second surface 27 of the insulating material 26 is in abutment with the inside surface 38 of the receptor 28. Thus, the cup, 12, the insulation material 26 and the receptor hereof cooperate to define the lower assembly 11.

The lower assembly 11 further includes means 29 for fastening the upper assembly 13 to the lower assembly 11. In a preferred embodiment, the means 29 includes at least one and, preferably, a plurality of clamps 29a, 29b, etc. (two being shown). The clamps 29a, 29b are swivelably attached to the wall 32. The clamps 29a, 29b nest in associated recesses 29c and 29d, respectively, formed in the side wall 32 of the receptor 28, as shown. Hooks in the recesses 29c and 29d receive the at least one clamp 29a and 29b, respectively.

Each clamp 29a or 29b has a first side 33 and a second side 35, comprises a tongue 45 including a snag or tang 47, a pivot frame 49 and a pair of side flanges 51. The snag 47 is integrally attached to an end of the tongue 45 and extends outwardly from the first side 33. The side flanges 51 are integrally formed with and disposed about the midpoint of the tongue 45 and extend outwardly from the first side 33. Each flange 51 has an aperture 51a.

The pivot frame 49 includes a pin 61, a pair of arms 63a, 63b, and a cross bar 65. The pin 61 extends between the pair of side flanges 51, and has its opposite ends mounted in the apertures 51a in the side flanges. The arms 63a and 63b are swivelably connected to the pin 61 and extend outwardly, respectively, from each end of the pin 61, the arms receiving the cross bar 65, the cross bar 65 being substantially parallel to the pin 61.

The hooks in the recesses 29c and 29d are laterally and oppositely disposed on the lower assembly 11 and receive the cross bar 65 of the at least one clamp 29 to fasten the upper assembly 13 thereto. While the illustrated embodiment utilizes the clamping system outlined above, it is to be understood that there exists other means for fastening the upper assembly to the lower assembly. For example, screw-type fasteners, latches, elastic fasteners, velcro, snaps or other alternative clamping mechanisms can alternatively be utilized by the present invention.

As noted the upper assembly 13 includes an internally disposed cover 42. The cover 42 comprises a top or top wall 43 and an integrally formed side wall 44 depending upwardly from a junction 46 and terminating at free or second end 48. The cover 42 has an inside surface 50 and an outside surface 52. The side wall 44 of the cover 42 extends further downward than the other members of the upper assembly 13 such that when the two assemblies 11 and 13 are united, a portion of the side wall 44 extends into the cup 12.

Proximate the second end 48 of the side wall 44 are two opposed cuts 71a, 71b which align with the opposed embossments 69a, 69b, provided on the cup 12. The embossments provide a guide for interengagement between the side wall 44 of the upper assembly 13 and the side wall 16 of the cup 12 of the lower assembly 11. Such interengagement between the walls 44 and 16 allows for substantial sealing and proper alignment of the clamps 29a, 29b to respective receiving clamping bases 59a, 59b, as described below.

The insulation material or layer 54, preferably, includes a first surface 53 and a second surface 55, the insulation material 54 being a layer of insulation for insulating food containers and the contents stowed therein within the assembly 13. The layer 54 is disposed about the outside surface 52 of the cover 42 and is in contact therewith at the first surface 53. The insulation material 54 is of a thickness as to minimize the rate of heat absorption to the assembly 10 or heat loss therefrom, as will be further described in greater detail below.

The outer shell 56 has an interior or inside surface 73, which is in contact with the second surface 55 of the insulation material 54. The inside surface 73 surrounds the second surface 55 and the side wall 44 of the cover 42.

The outer shell 56 further comprises a top wall 57. The top wall 57 is preferably a circular member. The shell 56 has a cylindrical wall 58 integrally formed with and downwardly depending from the top wall 57 and terminating at a second end 62. The outer shell 56 includes an outer surface 60 and an inner surface 66. An upper lip 67 extends radially outward from the second end 48 of the cover 42 an engages the second end 62 of the outer shell 56. Upon interengagement between the upper and lower assemblies 11 and 13, the lips 21 and 67 abut. The top wall 57 preferably has at least one niche 94 formed therein in which is stowed a swivelabley attached handle 95.

A second niche or recess 96 is also formed in the top wall 57 in which is removably seated a handle 87 for use with food containers, as detailed below.

As noted above the upper assembly 13 further includes means 59 for receiving the fastening means 29 of the lower assembly 11. In the preferred embodiment, the upper assembly 13 includes at least one receiving duct 59, two of which are shown at 59a and 59b, the receiving duct 59 cooperating with the fastening means 29 to fasten the upper assembly 13 to the lower assembly 11. In the preferred embodiment, the at least one receiving duct 59 is disposed laterally on the outer closure, the receiving duct being an upward protrusion which receives the snag 47 of the at least one clamp 29.

It is to be appreciated that the lower assembly 11 and the upper assembly 13 cooperate to define a compartment 70 for removable storage of, preferably, a plurality of stackable food containers shown at 72a, 72b, 73c, etc. Each food container has substantially equal dimensions to one another. Each food container is dimensioned to seat within the compartment 70 and includes a base 74 and a wall 76 integral therewith and extending upwardly from a junction 78 therebetween to a free end 80a. The wall 76 has an outer surface 84a and an inner surface 82a. A catch 85 is secured to the wall 76 for removably attaching the handle 87 to the food container 72a. The catch 85 provides a space between its interior surface and the wall 76 for insertion of the handle.

Preferably, each food container further includes a removable cover member 86. The upper surface of the cover 86 is dimensioned such that a base of another food container may snugly fit thereon for stackability.

The containers 72a, 72b, 72c cooperate together to be snugly disposed within the inner compartment 70 of the assembly 10 without substantial shifting therein. The food containers may be arbitrarily stacked onto one another.

In use, foodstuffs may be stored in the containers 72a, 72b, 72c. Particularly, heated or cooled food may be stored in the containers 72a, 72b, 72c. As noted above, the containers cooperate together to be disposed within the inner compartment 70. When disposed in the inner compartment 70, the containers having food therein are insulated to substantially minimize the rate of heat absorption or heat loss therefrom.

Having thus described the invention, what is claimed is:

1. An insulated housing assembly comprising:
    (a) a lower assembly, the lower assembly being cup shaped and including inside and outside surfaces and thermal insulating material filling the space between said surfaces, said cup shaped lower assembly forming a lower chamber including an upwardly extending side wall and said inside surface including a pair of embossments;
    (b) an upper assembly, the upper assembly being mateable with the lower assembly and forming an interior compartment,
    the upper assembly being cup shaped and including a top wall, a cylindrical wall, inside and outside surfaces, and thermal insulating material filling the space between said surfaces, said cup shaped upper assembly forming an upper chamber and said cylindrical wall extending downwardly from the top wall and formed to include a pair of cut outs, said cylindrical wall being adapted to be snugly received, at least in part, in the lower chamber and interengage said cut outs with said embossments;
    (c) means for sealingly, releasably locking the upper and lower assemblies together, said means for sealing including said embossments providing a guide for interengagement between the side walls of the upper and lower assemblies and allowing for substantial sealing and alignment therebetween, and
    (d) a plurality of food storage containers removably stacked in said compartment, each said food storage container having a base and a lid with a first food container lid supporting the base of the next succeeding food container when the food containers are stacked in the compartment.

2. The insulated housing assembly of claim 1, wherein each said lower and upper assembly comprises a cup the exterior surface of which is covered in substantial part by said insulating material, each said cup comprising a base and a side wall that extends upwardly from the base and terminates at an upper end, the side wall forming the inside surface of the assembly and the upper end having an outward radially extending lip parallel to the base, the outwardly extending lips being adapted to abut one another upon interengagement of the upper and lower assemblies.

3. The insulated housing assembly of claim 2, wherein the means for sealingly, releasably locking the upper and lower assemblies comprises:
    each said upper and lower assembly includes an outer shell the interior surface of which is encapsulated in said insulating material, the exterior surface of said outer shell being formed to include an axially elongated recess extending in a direction oppositely of its respective lip,
    at least one clamp, said clamp being swivelably attached to the recess formed in the exterior surface of the outer shell, said clamp being movable between an unlocked position disengaged from the upper assembly and a locked position tightly drawn into clamping engagement with the lip on said upper assembly, said clamp being substantially flush with the exterior surface when disposed in the locked position.

4. The insulated housing assembly of claim 1, wherein the top wall includes a first niche therein for storing a swivelably attached handle used in transporting the housing assembly, and a second niche therein for storing a removable handle for a food container, the handles when stored in their respective niches being adapted to be substantially flush with the exterior surface of the outer shell.

5. The food storage housing assembly of claim 4, wherein the food storage housing comprises:
    a base, a wall integrally formed with the base, a catch secured to the wall for removably attaching the removable handle, and a cover having upper and lower surfaces, wherein the upper surface is dimensioned such that the base of another food container may be seated securely thereon when the containers are stacked.

6. An insulated food storage housing assembly comprising
    (a) a lower assembly,
    (b) an upper assembly adapted to mate with said lower assembly and form a closed interior compartment, said upper assembly including a top wall,
    (c) locking means for sealingly, releasably locking the assemblies together when the assemblies are mated, said interlocked assemblies forming an interior compartment,
    (d) orienting means, disposed in part in said compartment, for orienting the upper assembly relative to the lower assembly,
    (e) recess means associated with said top wall for flush mounting a handle for carrying the assembly and a handle for use with a food container, and
    (f) a stackable food container removably disposed in said compartment.

* * * * *